(No Model.)
H. SALZER.
MEANS FOR PACKING FOOD ARTICLES.
No. 477,849. Patented June 28, 1892.
Fig. I.
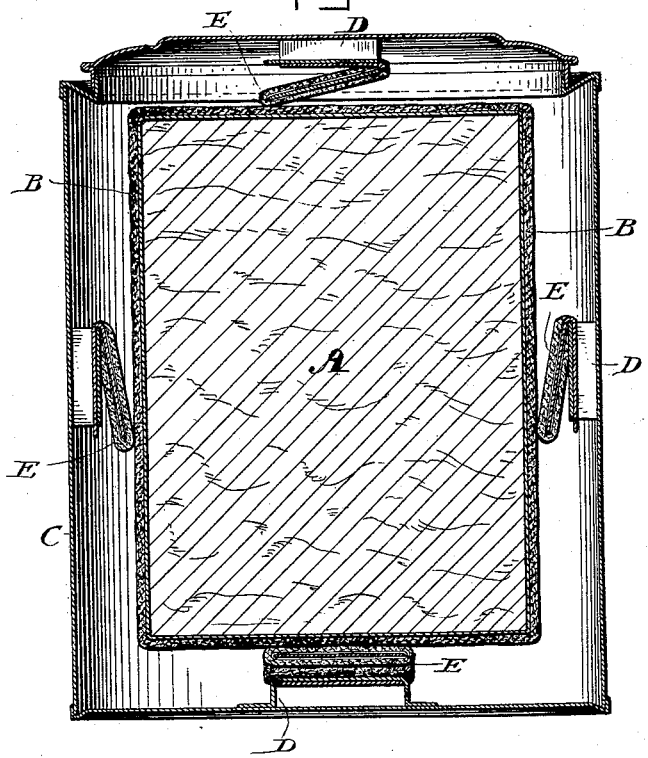
Fig. II.
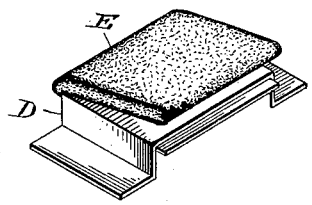
Witnesses:
Inventor;
Henry Salzer.
By his Attorneys,

UNITED STATES PATENT OFFICE.

HENRY SALZER, OF BALTIMORE, MARYLAND.

MEANS FOR PACKING FOOD ARTICLES.

SPECIFICATION forming part of Letters Patent No. 477,849, dated June 28, 1892.

Application filed July 16, 1891. Serial No. 399,760. (No model.)

*To all whom it may concern:*

Be it known that I, HENRY SALZER, a resident of Baltimore, Maryland, have invented a new and useful Improvement in Means for Packing Food Articles, which improvement is fully set forth in the following specification.

The present invention has reference to means for packing food articles, particularly meats, to insure their preservation in a perfectly natural state.

Many attempts have heretofore been made to preserve meat without deterioration and without change of condition or loss of flavor; but for economic reasons the ordinary canning method has not been supplanted. The objections to this method are well understood, and meat as preserved acquires a distinct and easily-recognized flavor, due to changes induced or permitted by contact with the metal. While the exact nature of these changes is not ascertained, the fact that they are offensive to the taste and probably injurious to health is generally accepted. They are believed to be due partly to the action of metallic oxides and partly to telluric influences, (such as heat and electricity,) of which the metal is a good conductor. The effects above indicated are intensified when the meat is forced into the cans under strong pressure, as is the general practice of meat-packers. While it is possible to avoid these difficulties by surrounding the meat with an inner jacket of glass or earthenware, as has been proposed, this method is not commercially useful because of the expense and of liability of breakage of the fragile envelope.

According to my invention the inner walls of the can are provided with projections or contact-pieces of a non-conducting substance, which keeps the metal out of contact with the meat or with its wrapper or envelope. These contact-pieces may be made of earthenware or of plaster applied to fabric and wrapped around a strip or support or of any substance sufficiently cheap and which is at the same time a non-conductor of the telluric influences by which the meat is affected. The contact-pieces may be detachable from the body of the can or may be fixed thereto, as preferred. The meat itself is preferably surrounded by a close-fitting germ-proof jacket or shell composed of plaster-of-paris or similar substance which has been applied in a plastic state around the meat and whose pores are closed by a fatty substance—such as the natural grease of the meat—or by an inorganic substance, such as paraffine. This inclosure and treatment of the meat is preferably carried out in substantial accordance with the process described in my patents of June 19, 1888, Nos. 384,720 and 384,721. Even when incased in such a jacket or shell I have found that it will not do to surround the latter with a close-fitting can, since the influences above referred to are able to reach and affect the meat to an appreciable extent.

While the means of preservation herein described are more expensive than simple canning, they serve the purpose of furnishing to the public meat in a wholesome and natural state and perfectly sterilized, a condition which is coming to be more and more regarded as of great hygienic importance.

In the accompanying drawings, which form part of this specification, Figure I is a view in vertical section of my improved can, and Fig. II a perspective view of one of the contact-pieces or projections.

A represents the piece of meat which has been compressed and molded to the desired form and incased in a shell B of plaster-of-paris or similar material and treated to destroy and exclude all organisms.

C is the metal can, which, as shown, has on the top, bottom, and sides strips D, of sheet metal, soldered to the inner walls of the can and forming sockets.

E are the incased contact-pieces, which, as shown, are formed of strips of metal bent near the middle and covered on one side of the bend with a non-conducting substance. The uncovered end of the metal strip can be fitted into the socket, and the pieces E are thus readily removed. Space, however, may be saved by applying the non-conducting material directly to the loops or strips D, and in many ways the construction may be modified as to form and materials without departing from the spirit of the invention.

The space between the plaster jacket and can may be filled with any suitable antiseptic or preservative gas before sealing the can.

I claim as my invention—

A food-package comprising a germ-proof shell or wrap of non-metallic substance tightly inclosing an article of food, an inclosing metallic can sealed air-tight, and contact-pieces of non-conducting substance separating the inner shell or wrap and the metallic can, substantially as described.

In testimony whereof I have signed this specification in the presence of two subscribing witnesses.

HENRY SALZER.

Witnesses:
 THOS. KELL BRADFORD,
 S. W. BRADFORD.